United States Patent [19]
Dahill, Jr.

[11] 3,714,220
[45] Jan. 30, 1973

[54] MYRCENE-METHACRYLONITRILE ADDUCTS

[75] Inventor: Robert T. Dahill, Jr., Perth Amboy, N.J.

[73] Assignee: Givaudan Corpoartion, Clifton, N.J.

[22] Filed: Dec. 29, 1969

[21] Appl. No.: 888,956

[52] U.S. Cl..................................260/464, 252/522
[51] Int. Cl..........................................C07c 121/48
[58] Field of Search ......................260/464; 252/522

[56] References Cited

UNITED STATES PATENTS

| | | | |
|---|---|---|---|
| 2,375,937 | 5/1945 | Miller et al. | 260/464 |
| 3,030,384 | 4/1962 | Sommerville | 252/522 X |
| 3,168,550 | 2/1965 | Blumenthal | 260/464 |
| 3,265,739 | 8/1966 | Blumenthal | 252/522 X |

*Primary Examiner*—Joseph P. Brust
*Attorney*—Cifelli and Behr

[57] ABSTRACT

There is provided a novel adduct of myrcene and methacrylonitrile which is useful as an odorant in the perfume industry. The adduct possesses a sweet floral odor suggestive of nasturtium, and moreover, possesses a remarkable stability to oxidation.

1 Claim, No Drawings

MYRCENE-METHACRYLONITRILE ADDUCTS

DESCRIPTION OF THE PRIOR ART

The nitriles of cinnamic acid, 3, 7-dimethyl-2,6-octadienoic acid and trans 2-nonenoic acid have been disclosed as possessing odorant qualities. Heretofore, isoalkenylcyclohexenyl nitriles which possess properties useful to the perfumers art were not known. However, it has been found that several isoalkenylcyclohexenyl nitriles, while possessing recognizable odors, do not possess odorant qualities which are useful in the perfume compounders art.

SUMMARY OF THE INVENTION

There is provided a novel adduct of myrcene and methacrylonitrile which possesses a soft, floral odor which has not been observed in any nitrile heretofore. The adduct is a mixture of isomers of the following structural formulas

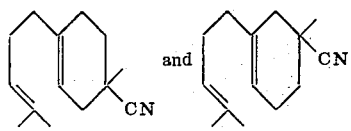

The novel adduct possesses remarkable stability to light and air, and this stability combined with its lack of color makes it useful as a base for perfumes. The novel adduct of the present invention is produced by reacting the components at elevated temperatures in an autoclave.

DESCRIPTION OF THE PREFERRED EMBODIMENTS

Myrcene and methacrylonitrile are charged into an autoclave with a trace of a free radical suppressant such as hydroquinone and the like. There may be utilized either equimolar proportions, an excess of myrcene or an excess of methacrylonitrile. For purposes of large-scale production it is preferred to utilize an excess of methacrylonitrile since this reagent is cheaper. However, the progress of the reaction is not affected substantially thereby and the use of excess methacrylonitrile is by no means critical. While the reaction may be carried out in any reaction-inert solvent, for example, hydrocarbon solvents such as hexane, benzene, toluene, xylene, and the like, it is preferred to carry out the reaction in the absence of solvent.

The reaction vessel is purged of oxygen, suitably by charging the supernatant cavity with a reaction-inert gas, such as nitrogen, to a pressure of, say, 20 p.s.i., and releasing the pressure from about 2 to about 4 times. In view of the volatility of the reagents, vacuum should not be used to remove the air.

The reaction mixture is then heated to a temperature of from about 50° to about 300° C. during which heating there is generated an initial pressure of between 30 and 50 p.s.i. It is preferred, however, to operate at a temperature of between 125° and 165° C. at a pressure of from about 30 to about 40 p.s.i. The actual pressure generated will depend upon the amount of reagents charged. The reaction is continued until completion which will involve a time period of from about 1 to about 30 hours, depending upon the temperature and proportion of reagents charged. The progress of the reaction is followed by gas liquid chromatography, suitably using an SE 30 column at 225° C.

Upon completion of the reaction, the autoclave is cooled, and the reaction product separated from the unreacted starting materials by distillation under low vacuum. It is preferred to utilize a water pump vacuum; that is to say, a vacuum of between 10 and 20 mm of Hg. After removal of the unreacted starting materials, the residue is further purified by distillation. It is preferred to distill using a fractionating column, suitably a column packed with glass helices at a moderate vacuum; that is to say, a vacuum of between about 1 and 0.1 mm. of Hg.

The product of the present invention has an unexpected and unusual nasturtium-like floral odor of great interest to perfumery compounders. The product is of utility as a perfume base. Various compositions utilizing the product would be available to one skilled in the perfume compounders art. However, for purposes of exemplification and not for purposes of limitation there is shown in Table I below a typical composition utilizing the products of the present invention.

TABLE I

| | |
|---|---:|
| Bergamot oil | 125 |
| Coumarin 10% in DEP* | 13 |
| Geraniol | 50 |
| Gum Balsam Peru | 25 |
| Ionone Beta | 13 |
| Lime oil | 62 |
| Linalool | 75 |
| Linalyl acetate | 125 |
| Orange oil, sweet | 75 |
| Sandela[1] | 125 |
| Versalide[2] | 37 |
| Ylang Bourbon | 25 |
| 3-Cyano-3-methyl- and 4-Cyano-4-methyl-1-(4-methyl-3-pentenyl)cyclohexene | 250 |
| | 1000 |

*Diethylphthalate
[1] Registered trademark of Givaudan Corp. for isocamphylcyclohexanol
[2] Registered trademark of Givaudan Corp. for 1, 1,4,4-tetramethyl-6-ethyl-7-acetyl-1,2,3,4,-tetrahydronaphthalene The novel product of the present invention was tested for stability in an accelerated test.

The samples were exposed to air at 100° C. for 23 hours. The results were summarized in Table II below and showed good stability.

TABLE II

| | Odor |
|---|---|
| 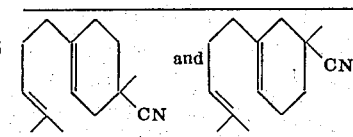 | Smooth floral odor. |

EXAMPLE I

A mixture of 426 g. of myrcene, 178 g. of methacrylonitrile and a trace of hydroquinone is charged into a one-liter stainless steel autoclave equipped with an agitator and a gague reading to 300 pounds. Nitrogen pressure is applied and released 3 times. The mixture is heated with good agitation to a temperature of 150° C. for 8 hours. The progress of the reaction is monitored by gas liquid chromatography on an SE 30 column at 225° C. The autoclave is cooled and the reaction mixture removed. This mixture is distilled under water-pump vacuum to remove the unreacted starting materials. The residue is then distilled under a 6-inch fractionating column packed with glass helices to yield the desired adduct consisting of 3-cyano-3-methyl-and 4-cyano-4-methyl-1-(4-methyl-3-penthyl) cyclohexene. B.p. 103 (0.5 mm of Hg.) yield,249g, (64 percent based on unrecovered myrcene). $n_D^{20}$ 1.4826, VPC homogeneous on SE 30 at 225° C. (Purity 97 percent) I.R. 3.50, 4.50, 6.02, 6.97, 7.31, 7.33 microns

```
NMR   4.60τ      (1 olefinic proton)
      4.90τ      (1 olefinic proton)
                        CH₃
      8.30τ ⎫        /
      8.35τ ⎬     C
            ⎭        \
                        CH₃

CH₃
      8.60τ         ✕
                        CN
```

Further gas liquid chromatographic analysis indicates that the product contains two components in the ratio 35 to 65 approximately.

An evaluation of the utility to perfumery compounders was carried out comparing the product of the present invention (I) to cyclohexenyl nitriles of related structure which are derived from Diels-Alder reactions of myrcene (Compounds II and III) and alloocimene (Compounds IV → VI) and the corresponding unsaturated nitrile. It will be seen that the nitriles from which compounds II through VI were derived are as follows.

```
II   -   acrylonitrile
III  -   crotononitrile
IV   -   acrylonitrile
V    -   methacrylonitrile
VI   -   crotononitrile.
```

It was the surprising result of this comparison that while all of the products possessed odor, only one, that of the present invention, possessed an odor of the nature and strength to be useful to the perfume compounders.

There results are summarized in Table III below.

TABLE III

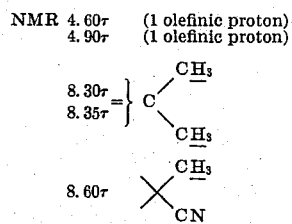

I

Perfumers evaluation: Unusual nasturtium-floral odor of much interest in perfumery.

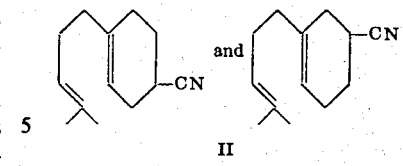

II

Common oily-floral odor, of no value in perfumery.

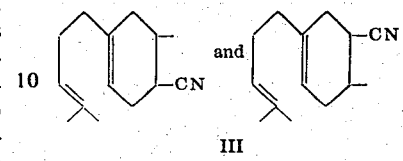

III

Spicy-phenolic odor, of no vlaue in perfumery.

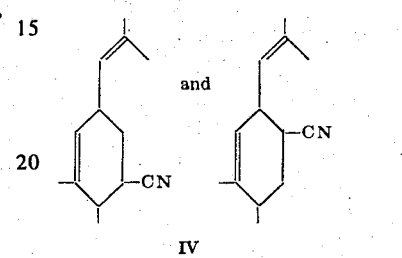

IV

Weak, spicy odor, of no value in perfumery.

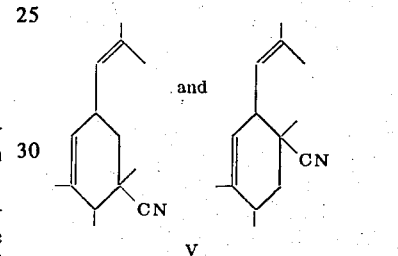

V

Weak, licorice odor of no value in perfumery.

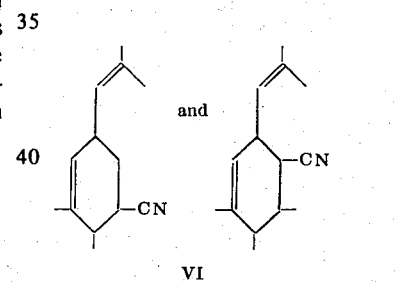

VI

Weak, burnt odor, of no value in perfumery.

What is claimed is:

1. The Diels-Alder adduct selected from the group consisting of at least one of the compounds having the following structural formulas:

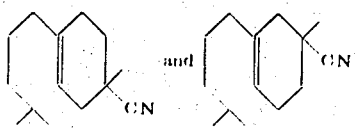

* * * * *